(12) United States Patent
Ando et al.

(10) Patent No.: US 7,625,467 B2
(45) Date of Patent: Dec. 1, 2009

(54) SUPPORT BEAM FOR EASILY POLYMERIZEABLE SUBSTANCE TREATMENT DEVICE AND EASILY POLYMERIZEABLE SUBSTANCE TREATMENT DEVICE

(75) Inventors: Yoshimasa Ando, Otake (JP); Hideyasu Takezawa, Otake (JP); Yasuhiro Kabu, Saeki-gun (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 647 days.

(21) Appl. No.: 10/542,110

(22) PCT Filed: Jan. 14, 2004

(86) PCT No.: PCT/JP2004/000187

§ 371 (c)(1),
(2), (4) Date: Jul. 13, 2005

(87) PCT Pub. No.: WO2004/062789

PCT Pub. Date: Jul. 29, 2004

(65) Prior Publication Data

US 2006/0231376 A1 Oct. 19, 2006

(30) Foreign Application Priority Data

Jan. 15, 2003 (JP) .............................. 2003-007140

(51) Int. Cl.
*B01D 3/32* (2006.01)
*B01J 19/00* (2006.01)
(52) U.S. Cl. .................... 202/266; 202/267.1; 202/270; 422/241; 422/243

(58) Field of Classification Search .......... 159/DIG. 15; 202/152, 158, 266, 267.1, 270; 203/8, 86, 203/DIG. 21; 562/600; 422/241, 243
See application file for complete search history.

(56) References Cited

U.S. PATENT DOCUMENTS

| 5,385,527 A * | 1/1995 | Fukada et al. ............... 493/135 |
| 7,235,158 B2 * | 6/2007 | Matsumoto et al. ............ 203/8 |
| 2001/0030120 A1 | 10/2001 | Mitsumoto et al. |
| 2002/0190403 A1 * | 12/2002 | Nutter et al. ............. 261/114.1 |

FOREIGN PATENT DOCUMENTS

| JP | 49-004136 | 1/1974 |
| JP | 59-154301 | 10/1984 |
| JP | 61-147102 | 9/1986 |
| JP | 8-010502 | 1/1996 |

OTHER PUBLICATIONS

Mechanical Design Handbook, 3$^{rd}$ Edition, Mechanical Design Handbook Editorial Committee ed. (Maruzen Publishing), Table 6-1 on pp. 330-331 of the handbook, Mar. 10, 1992. (with Partial English translation of table 6-1).

* cited by examiner

*Primary Examiner*—Virginia Manoharan
(74) *Attorney, Agent, or Firm*—Oblon, Spivak, McClelland, Maier & Neustadt, P.C.

(57) ABSTRACT

The present invention provides a support beam for use in an easily polymerizeable substance treatment apparatus. The support beam supports or reinforces an internal provided in the easily polymerizeable substance treatment apparatus. The support beam has an internal mounting portion to which the internal is attached, and a folded-back portion, at least part of which, is inclined downward with respect to a horizontal direction when approaching an end thereof.

13 Claims, 4 Drawing Sheets

SUPPORT BEAM FOR EASILY POLYMERIZEABLE SUBSTANCE TREATMENT DEVICE AND EASILY POLYMERIZEABLE SUBSTANCE TREATMENT DEVICE

TECHNICAL FIELD

The present invention relates to a support beam for use in an easily polymerizeable substance treatment apparatus and an easily polymerizeable substance treatment apparatus. Furthermore, the present application is based on Japanese Patent Application No. 2003-007140, the content of which is incorporated herein.

BACKGROUND ART

Internals including trays, fillings, distributors and the like are installed inside easily polymerizeable substance treatment apparatuses (for example, distilling columns and absorption towers), which perform unit operations such as distillation, absorption and the like of easily polymerizeable substances, in order to increase the number of theoretical plates and enhance treatment efficiency. The trays have at least a portion of the upper surface being horizontal and through holes formed therein that penetrate the upper and lower surfaces, and are normally attached to a support beam.

Here, a support beam refers to a beam that supports or reinforces an internal, and is a long member having an internal mounting portion to which an internal is attached, and a folded-back portion in which the internal mounting portion is folded back. The support beam is installed within the easily polymerizeable substance treatment apparatus by the end(s) of the beam being fixed to the inside wall or support ring attached to the inside wall of the easily polymerizeable substance treatment apparatus.

In this support beam, the folded-back portion is provided to support or reinforce the internal mounting portion. Namely, as a result of having a folded-back portion, in addition to being able to adequately withstand the weight of the tray, the fixing surface area when the support beam is fixed to the easily polymerizeable substance treatment apparatus can be increased. In addition, the liquid flow of an easily polymerizeable substance is not obstructed as a result of the support beam being folded back with the folded-back portion.

FIG. 7 is a cross-sectional view showing an internal of an easily polymerizeable substance treatment apparatus and a support beam of the prior art. This support beam 30 has an internal mounting portion 32 where internal 31 is attached, a folded-back portion 33 in which the internal mounting portion 32 is folded back 180 degrees, and a connecting portion 34 that is perpendicular to internal mounting portion 32 and folded-back section 33, and connects one of their end portions along their lengthwise direction each other. Namely, this support beam has a U-shaped cross-portion when cut orthogonal to the lengthwise direction. Furthermore, such a support beam having a U-shaped cross portion is available commercially and can be acquired easily. In addition, this type of support beam having a U-shaped cross-portion facilitates fastening of an internal with bolts and nuts as compared with that in which internal mounting portion 32 and folded-back portion 33 are connected each other at both of their corresponding end portions along their lengthwise direction (support beam having a box-shaped (square-shaped) cross-portion).

Furthermore, as shown in Table 6-1 on page 331 of the Mechanical Design Handbook, 3rd edition, Mechanical Design Handbook Editorial Committee ed. (Maruzen Publishing), the shape of industrial support beams is such that the folded-back portion of a support beam having a U-shaped cross-portion is normally connected perpendicular to the connecting portion, namely horizontally.

However, in the case of treating an easily polymerizeable substance with a treatment apparatus equipped with a support beam of the prior art, the liquid of an easily polymerizeable substance tends to adhered to the upper surface of the folded-back portion of the support beam. Here, since the upper surface of the folded-back portion is horizontal, if the liquid of an easily polymerizeable substance becomes adhered thereto, it is difficult for the liquid to run off and the liquid remains there for a long period of time. Since the inside of an easily polymerizeable substance treatment apparatus is heated, in the case the liquid remains at the portion for a long period of time, the liquid of the easily polymerizeable substance accumulates heat and rises in temperature, thereby causing the easily polymerizeable substance to polymerize and form a polymer, after which polymerization progresses using that polymer as a starting point, and causes the polymer to gradually become larger.

In the case through holes serving as vapor-liquid flow paths for an easily polymerizeable substance are formed in an internal comprising an easily polymerizeable substance treatment apparatus, the polymer increases in size and ends up blocking the through holes. In this manner, in the case the through holes of an internal have been blocked, since the function as an internal decreases, this ultimately causes a decrease in the treatment efficiency of the easily polymerizeable substance.

Therefore, this is typically dealt with by injecting a polymerization inhibitor for preventing polymerization of the easily polymerizeable substance, or by increasing the amount injected of the inhibitor. However, it is necessary to inject a large amount of polymerization inhibitor in order to prevent polymerization at locations where liquid tends to be retained easily such as on the upper surface of the folded-back portion of the support beam, thereby making this uneconomical.

Furthermore, in the example shown in FIG. 7, although the internal and support beam are separate members, as shown in FIG. 8, there are also case in which the internal and support beam are in the form of an integral member 35. In this case as well, since the upper surface of folded-back portion 33 is horizontal, this member has the same problems as in the example shown in FIG. 7.

The present invention is achieved in consideration of the aforementioned circumstances, and the object of the present invention is to provide a support beam used for an easily polymerizeable substance treatment apparatus that economically prevents polymerization of the easily polymerizeable substance, and an easily polymerizeable substance treatment apparatus.

DISCLOSURE OF THE INVENTION

A support beam of the present invention is a support beam for use in an easily polymerizeable substance treatment apparatus for treating easily polymerizeable substances, the support beam being for supporting or reinforcing an internal provided in the easily polymerizeable substance treatment apparatus; comprising:

an internal mounting portion to which the internal is attached, and a folded-back portion at which the internal mounting portion is folded back so that at least part of the folded-back portion is inclined downward when approaching an end thereof, An apparatus of the present invention is an easily polymerizeable substance treatment apparatus, comprising: an internal provided in the easily polymerizeable substance treatment apparatus, and a support beam that supports or reinforces the internal; the support beam having an internal mounting portion to which the internal is attached, and a folded-back portion at which the internal mounting portion is folded back so that at least part of the folded-back portion is inclined downward when approaching an end thereof.

BEST MODE FOR CARRYING OUT THE INVENTION

The present invention relates to a support beam for an easily polymerizeable substance treatment apparatus that supports or reinforces an internal such as a tray, filling, distributor provided or the like which are included inside an easily polymerizeable substance treatment apparatus that treats easily polymerizeable substances. Moreover, the present invention relates to an easily polymerizeable substance treatment apparatus provided with this support beam.

Figure 1:
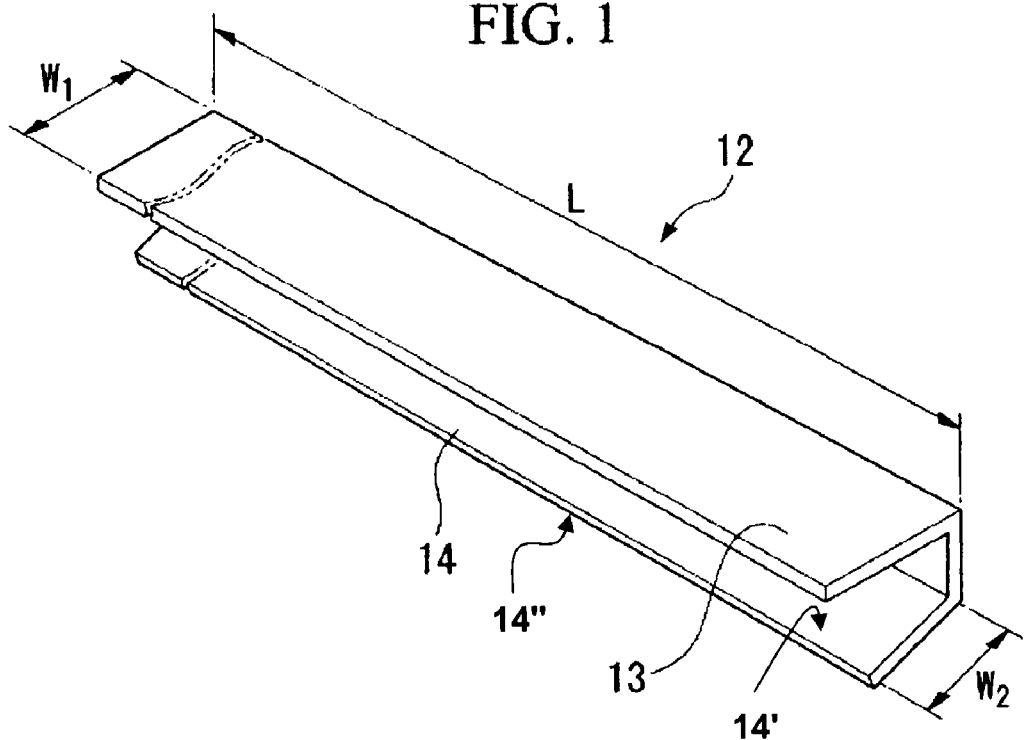
FIG. 1 is a perspective view showing an embodiment of a support beam for an easily polymerizeable substance treatment apparatus of the present invention.
Figure 2:
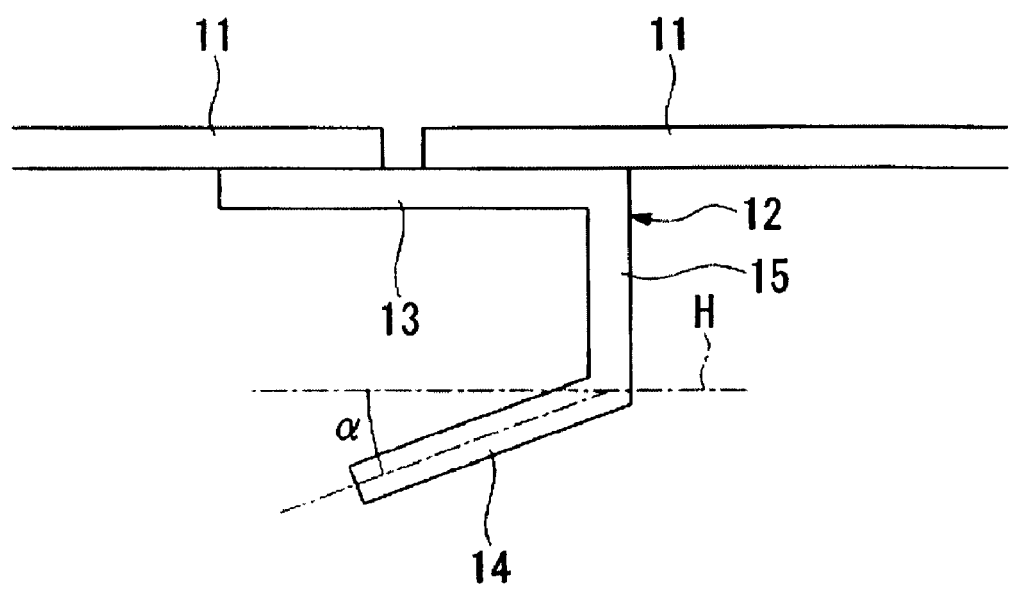
FIG. 2 is a cross-sectional view showing a tray and an embodiment of a support beam for an easily polymerizeable substance treatment apparatus of the present invention.

The following provides an explanation of an embodiment of a support beam for an easily polymerizeable substance treatment apparatus (to simply be referred to as a support beam) and an easily polymerizeable substance treatment apparatus (to be simply referred to as a treatment apparatus) of the present invention with reference to FIGS. 1 and 2. Furthermore, FIG. 2 is a cross-sectional view portrayed when the support beam is cut in the orthogonal direction with respect to the lengthwise direction and the tray supported by the support beam is cut simultaneously.

The treatment apparatus of this embodiment is a bottomed, cylindrical distilling column that distills an easily polymerizeable substance, and is provided with an internal in the form of tray 11, and a support beam 12 that supports tray 11 in the apparatus.

Support beam 12 has a tray mounting portion 13 to which tray 11 is attached (internal mounting portion), a folded-back portion 14 wherein tray mounting portion 13 is folded back, and a connecting portion 15 that connects tray mounting portion 13 and folded-back portion 14 such that corresponding one side of the portion is connected each other along their lengthwise direction.

Tray 11 is attached to the upper surface of tray mounting portion 13. Here, tray 11 is normally attached to tray mounting portion 13 by fastening members such as bolts and nuts or by welding and so forth.

Folded-back portion 14 is inclined downward towards the end. Here, in the case of taking the angle between horizontal direction H and folded-back portion 14 to be angle of inclination $\alpha$, then angle of inclination $\alpha$ is $0° < \alpha < 90°$, preferably $5° < \alpha < 60°$, more preferably $10° \leq \alpha \leq 45°$, and even more preferably $10° < \alpha < 30°$. If angle of inclination $\alpha$ is $0°$, the liquid of an easily polymerizeable substance adhered to the upper surface easily remains there, and if angle of inclination $\alpha$ is $90°$ or more, there is the risk of obstructing the flow of vapor-liquid inside the treatment apparatus. Furthermore, in the present invention, the preferable angle is the same as that described above even in the absence of a connecting portion.

A metal that is resistant to corrosion by easily polymerizeable substances is normally used for the material of support beam 12. Typical examples thereof include stainless steel such as SUS304 and SUS316, titanium, zirconium and tantalum. In addition, resins such as propylene may also be used as the material. However, the material of the support beam may be selected arbitrarily as necessary provided it has the shape of the present invention.

Although depending on the size of the treatment apparatus, weight of the tray and so forth, the dimensions of support beam 12 may be such that length L of the beam is 0.1 to 5 m, preferably 0.3 to 4 m, and more preferably 0.5 to 3 m. Width $W_1$ of tray mounting portion 13 is 0.01 to 0.3 m, preferably 0.03 to 0.2 m, and more preferably 0.05 to 0.15 m. Furthermore, this does not apply to the case of the support beam and tray mounting portion being integrated into a single unit as described later. Width $W_2$ of folded-back portion 14 may be 0.01 to 0.3 m, preferably 0.03 to 0.2 m, and more preferably 0.05 to 0.15 m. Although thickness can be selected arbitrarily, it is preferably 0.5 to 5 mm, and more preferably 1 to 3 mm. Folded-back portion 14 comprises inner surface 14' facing toward internal mounting portion 13 and outer surface 14" facing away from internal mounting portion 13 and inner surface 14' is parallel to outer surface 14". The length of the connecting portion may be 0.01 to 0.3 m, preferably 0.03 to 0.2 m, and more preferably 0.05 to 0.15 m.

In order to fix support beam 12 to a distilling column, it can be fixed directly to the distilling column or it can be fixed by attaching to a ring-shaped support ring(s) installed so as to run along the inside wall of the distilling column. At this time, there are no particular limitations on the fixation method, and examples thereof include fixing by welding and fixing by using fastening members (bolts and nuts).

In addition, folded-back portion 14 may also be composed of two or more continuous portions. In addition, the portion may also comprise two or more inclined portions, the angles of which may be the same or different. In the aforementioned case, the total of each total width is defined as $W_2$. In the case of the latter, the total angle of each portion is defined as angle of inclination $\alpha$.

Tray 11 attached to support beam 12 is a flat metal plate in which a large number of through holes (not shown) are formed that pass through the top and bottom of the plate. The upper surface of this tray 11 is horizontal to prevent the liquid of an easily polymerizeable substance adhered to that upper surface from running off, and is attached to tray mounting portion 13 of the support beam by being arranged so that the through holes are facing in the vertical direction.

Although the number of trays 11 in the distilling column is determined by considering the type, concentration and productivity of the easily polymerizeable substance, it is, for example, 1 to 100, and preferably 5 to 70.

There are no particular limitations on the easily polymerizeable substance distilled in the distilling column provided it is easily polymerized by heat and so forth. Examples thereof include unsaturated aldehydes such as (meth)acrolein, unsaturated carboxylic acids such as (meth)acrylic acid, (meth) acrylic acid esters such as methyl (meth)acrylate, ethyl (meth)acrylate, butyl (meth)acrylate, 2-ethylhexyl (meth) acrylate, hydroxyethyl (meth)acrylate, hydroxypropyl (meth)acrylate, (meth)acrylic acid dimethylaminoethyl ester and (meth)acrylic acid diethylaminoethyl ester, vinyl group-containing compounds such as acrylonitrile, styrene, vinyl acetate, and diolefin compounds such as butadiene, isoprene and chloroprene. One type of these easily polymerizeable substances may be used, or two or more types may be used as a mixture. The effects of the present invention are demonstrated particularly in the case the easily polymerizeable substance is at least one kind selected from (meth)acrolein, (meth)acrylic acid and (meth) acrylic acid esters.

In the aforementioned embodiment, since folded-back portion 14 of support beam 12 is inclined such that one end of the portion leans down ward, a liquid of an easily polymerizeable substance adhered to the upper surface of folded-back portion 14 moves downward according to the force of gravity, and ultimately drops from support beam 12. Thus, since the liquid does not remain for a long period of time on the surface of folded-back portion 14 of support beam 12, polymer formation is prevented. Namely, polymer formation can be prevented by changing the shape of support beam 12 without increasing the amount of polymerization inhibitor added, thereby making this economical.

Furthermore, the present invention is not limited to the aforementioned embodiment. For example, although the treatment apparatus of the aforementioned embodiment was a distilling column for distilling an easily polymerizeable substance, it may also be an absorption tower for absorbing an easily polymerizeable substance. In addition, the shape of the treatment apparatus may be that other than a cylindrical shape.

Figure 3:
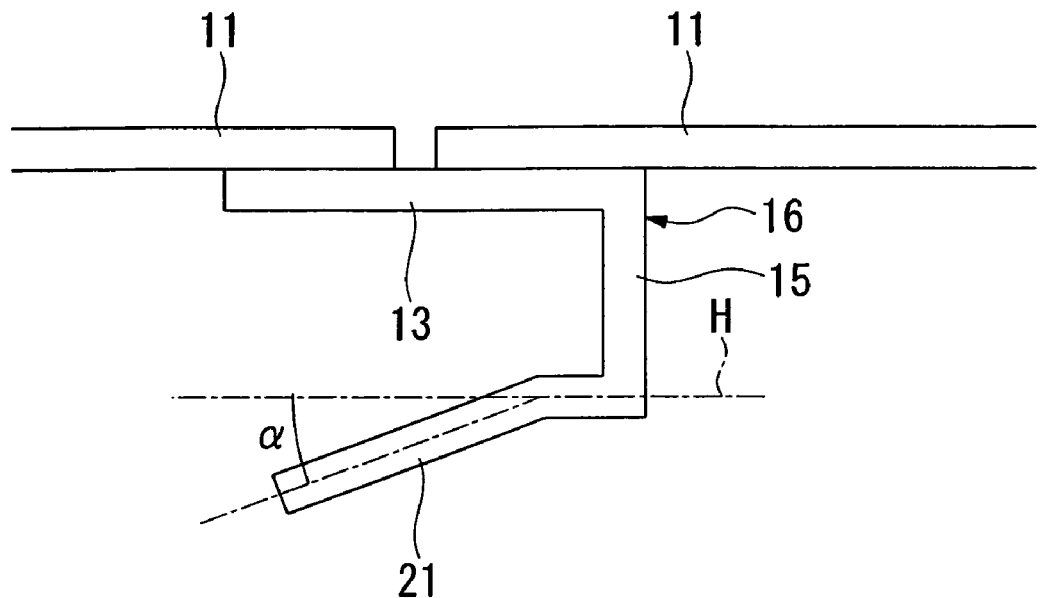
FIG. 3 is a cross-sectional view showing a tray and another embodiment of a support beam for an easily polymerizeable substance treatment apparatus of the present invention.
Figure 7:
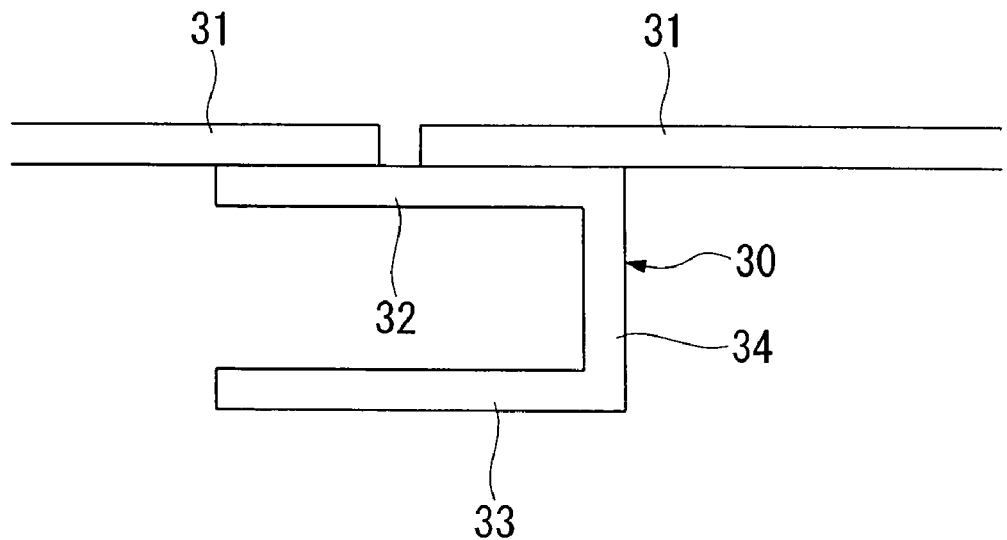
FIG. 7 is a cross-sectional view showing a tray and an example of a support beam for an easily polymerizeable substance treatment apparatus of the prior art.

In addition, with respect to the support beam, as shown in FIG. 3, a folded-back portion 21 may be partially inclined. Namely, folded-back portion 21 may be composed of two or more portions. A support beam 16 partially inclined in this manner can be produced by processing an existing support beam as shown in FIG. 7. In this case, the combined length of the inclined portion and non-inclined portion (portion parallel to the tray mounting portion) of folded-back portion 21 is defined as the aforementioned $W_2$. Although the length ratio of the inclined portion and non-inclined portion of folded-back portion 21 is arbitrary, the length of the inclined portion is preferably 10 or more, and more preferably 20 or more, when the length of the non-inclined portion is 1. In addition, although two or more inclined portions may be combined continuously, the total angle of each portion is defined as the aforementioned angle of inclination α. A non-inclined portion may be interposed between the portions.

Figure 4:
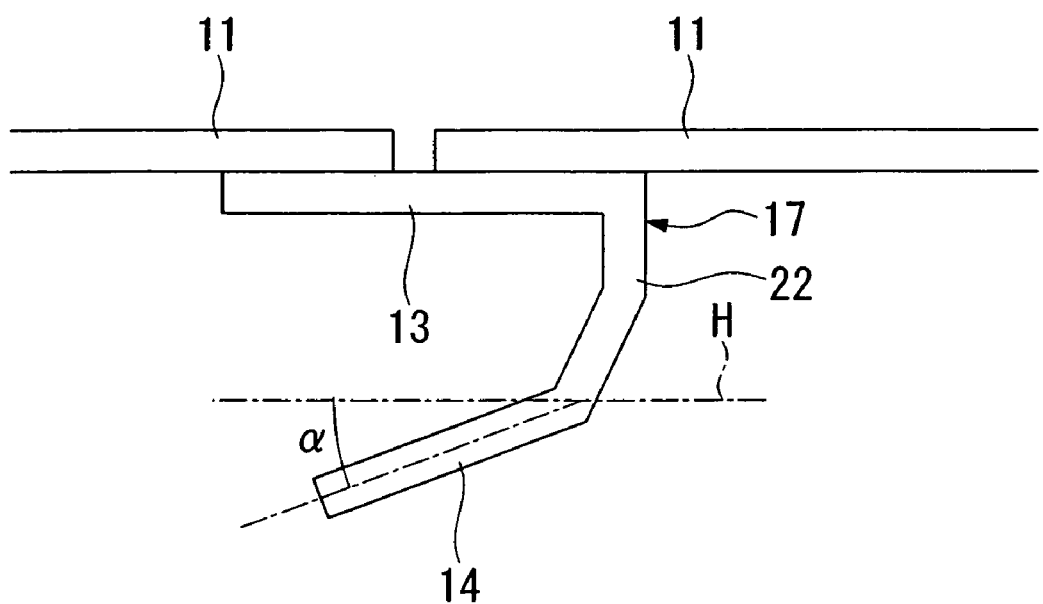
FIG. 4 is a cross-sectional view showing a tray and another embodiment of a support beam for an easily polymerizeable substance treatment apparatus of the present invention.

In addition, as shown in FIG. 4, the entirety of the connecting portion does not have to be perpendicular to tray mounting portion 13. Namely, a connecting portion 22 may be composed of two or more portions, and connecting portion 22 may be bent at an intermediate location. Connecting portion 22 has a portion that is perpendicular to tray mounting portion 13 and a portion that is inclined. In a support beam 17 of this shape, the retention of an easily polymerizeable substance on the connecting portion caused by surface tension can be prevented. Furthermore, although the number of bends of connecting portion 22 is arbitrary, 1 to 5 bends are preferable in the case they are provided. Furthermore, in the present invention, connecting portion 22 is not necessarily required to have a portion perpendicular to tray mounting portion 13, and for example, the angle formed by tray mounting portion 13 and the portion of connecting portion 22 that connects to the section 13 may be 1° to 80°, preferably 5° to 70°, and more preferably 10° to 45°.

Figure 5:
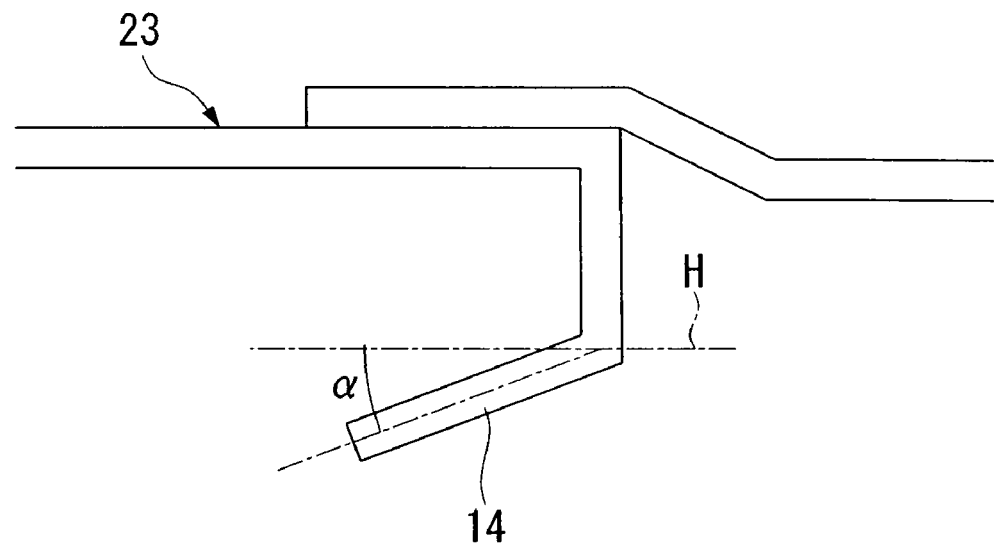
FIG. 5 is a cross-sectional view showing a tray and another embodiment of a support beam for an easily polymerizeable substance treatment apparatus of the present invention.
Figure 6:
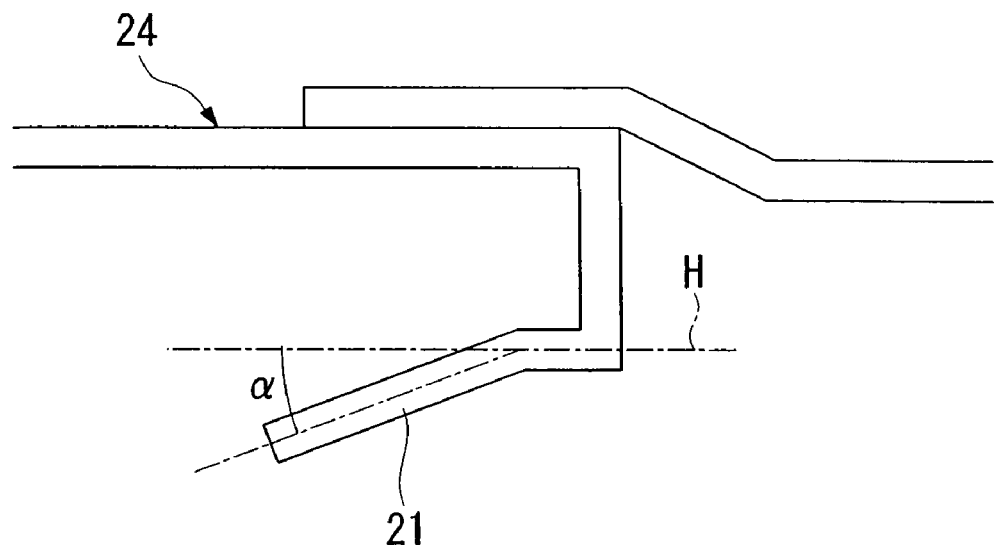
FIG. 6 is a cross-sectional view showing a tray and another embodiment of a support beam for an easily polymerizeable substance treatment apparatus of the present invention.

Moreover, although the support beam and tray are provided as separate members in the aforementioned embodiment, as shown in FIG. 5 or FIG. 6, support beam 12 and tray 11 maybe integrated into a single unit. Furthermore, integrated part of support beam/tray 23 of FIG. 5 is a tray integrated with support beam 12 shown in FIG. 2, while integrated part of support beam/tray 24 of FIG. 6 is tray 11 integrated with support beam 16 shown in FIG. 3. Integrating the support beam and tray into a single unit in this manner simplifies the internal structure of the treatment apparatus.

In addition, the portion that connects the corresponding surfaces in the support beam of the present invention may also be formed with a curved surface.

EXAMPLES

The following provides a more detailed explanation of the present invention through an example and comparative example.

Example 25 trays and a support beam that reinforces each tray were provided inside a distilling column (treatment apparatus). Here, the support beam is an integrated unit which is integrated into a single unit with the trays as shown in FIG. 5, and the angle of inclination α of folded portion 14 was 20°.

Methyl methacrylate was distilled using this distilling column. During distillation, the concentration of methyl methacrylate around the support beam and trays during the course of distillation was 99% by weight, and the temperature was set to 60 to 70° C. When the inside of the tower was opened one year after the start of distillation and inspected, there was no polymer observed around the support beam and trays. At this time, a polymerization inhibitor was supplied to the distilling column in an amount of 0.0001 based on the mass ratio based on the amount of liquid supplied to the distilling column.

Comparative Example

Figure 8:
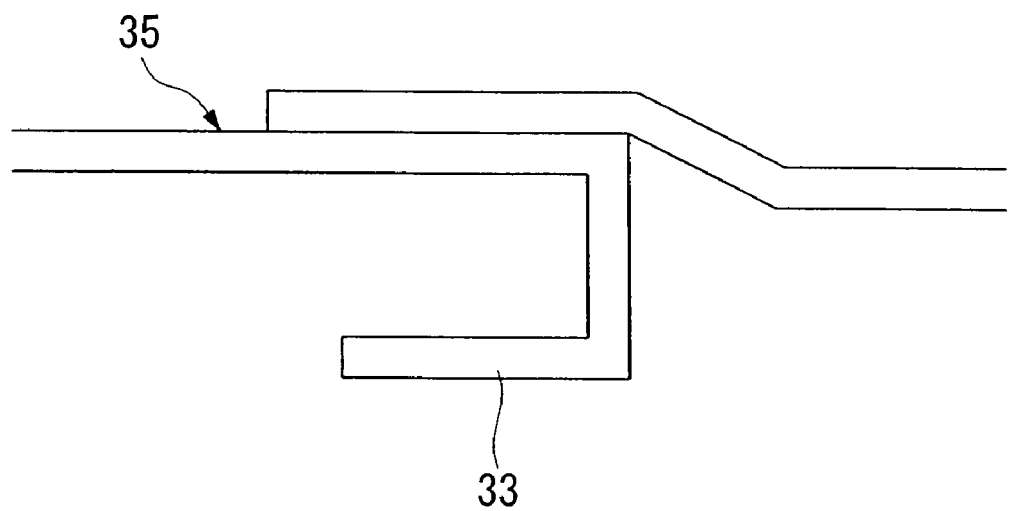
FIG. 8 is a cross-sectional view showing a tray and another example of a support beam for an easily polymerizeable substance treatment apparatus of the prior art.

With the exception of using a support beam integrated into a single unit with the trays as shown in FIG. 8, and making folded-back portion 33 of the support beam horizontal, methyl methacrylate was distilled in the same manner as the example. When the inside of the tower was opened one year after the start of distillation and inspected, a polymer had formed on the upper surface of folded-back portion 33, and the enlarged polymer was blocking a portion of the through holes in the trays that serve as vapor-liquid flow paths. Furthermore, one part of the enlarged polymer dropped to another tray provided below the tray on which the polymer was enlarge, and through holes thereof were stuffed. Consequently, the distillation efficiency was low and the distilling column demonstrated poor economical efficiency as compared with the example.

INDUSTRIAL APPLICABILITY

According to the present invention, a support beam has a characteristic shape, and polymer formation can be prevented without increasing the amount of polymerization inhibitor added since the liquid of an easily polymerizeable substance is not allowed to remain for a long period of time on the surface of a folded-back portion of the support beam. Namely, polymer formation can be prevented economically.

The invention claimed is:

1. A support beam in an easily polymerizeable substance treatment apparatus for supporting or reinforcing an internal provided in the easily polymerizeable substance treatment apparatus, comprising:
   (1) an internal mounting portion to which the internal is attached, (2) a folded-back portion which is folded back so that at least part of the folded-back portion is inclined downward with respect to a horizontal direction, wherein
   an angle $\alpha$ formed by the folded-back portion and the horizontal direction is $0°<\alpha<90°$ and (3) a connecting portion attached at one end to the internal mounting portion and at the other end to the folded-back portion.

2. The support beam for an easily polymerizeable substance treatment apparatus according to claim 1, wherein the easily polymerizeable substance is at least one substance selected from the group consisting of (meth)acrolein, (meth)acrylic acid and a (meth)acrylic acid ester.

3. The support beam for an easily polymerizeable substance treatment apparatus according to claim 1, wherein the angle $\alpha$ is $10°\leq\alpha\leq45°$.

4. The support beam for an easily polymerizeable substance treatment apparatus according to claim 1, wherein the support beam is stainless steel.

5. The support beam for an easily polymerizeable substance treatment apparatus according to claim 1, wherein the folded back portion comprises (i) a horizontal portion attached to the connecting portion and (ii) an inclined portion attached to the horizontal portion, wherein
   an angle $\alpha$ formed by the portion (i) and the portion (ii) is $0°<\alpha<90°$.

6. The support beam for an easily polymerizeable substance treatment apparatus according to claim 1, wherein the folded back portion comprises an inner surface facing toward the internal mounting portion and an outer surface facing away from the internal mounting portion and the inner surface is parallel to the outer surface.

7. An easily polymerizeable substance treatment apparatus, comprising: an internal provided in the easily polymerizeable substance treatment apparatus, and a support beam that supports or reinforces the internal; the support beam comprising (1) an internal mounting portion to which the internal is attached, (2) a folded-back portion which is folded back so that at least part of the folded-back portion is inclined downward with respect to a horizontal direction,
   wherein an angle $\alpha$ formed by the folded-back portion and the horizontal direction is $0°<\alpha<90°$ and (3) a connecting portion attached at one end to the internal mounting portion and at the other end to the folded-back portion.

8. The easily polymerizeable substance treatment apparatus according to claim 7, wherein the easily polymerizeable substance is at least one substance selected from the group consisting of (meth)acrolein, (meth)acrylic acid and a(meth)acrylic acid ester.

9. The easily polymerizeable substance treatment apparatus according to claim 7, wherein the angle $\alpha$ is $10°\leq\alpha\leq45°$.

10. The easily polymerizeable substance treatment apparatus according to claim 7, wherein the support beam is stainless steel.

11. The easily polymerizeable substance treatment apparatus according to claim 7, wherein the treatment of the easily polymerizable substance is distillation or absorption.

12. The easily polymerizeable substance treatment apparatus according to claim 7, wherein the folded back portion comprises (i) a horizontal portion attached to the connecting portion and (ii) an inclined portion attached to the horizontal portion, wherein
   an angle $\alpha$ formed by the portion (i) and the portion (ii) is $0°<\alpha<90°$.

13. The easily polymerizeable substance treatment apparatus according to claim 7, wherein the folded back portion comprises an inner surface facing toward the internal mounting portion and an outer surface facing away from the internal mounting portion and the inner surface is parallel to the outer surface.

* * * * *

UNITED STATES PATENT AND TRADEMARK OFFICE
CERTIFICATE OF CORRECTION

PATENT NO. : 7,625,467 B2 Page 1 of 1
APPLICATION NO. : 10/542110
DATED : December 1, 2009
INVENTOR(S) : Ando et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1114 days.

Signed and Sealed this

Second Day of November, 2010

David J. Kappos
*Director of the United States Patent and Trademark Office*